(12) United States Patent
Lin

(10) Patent No.: US 11,490,484 B1
(45) Date of Patent: Nov. 1, 2022

(54) RETROFIT LIGHT-EMITTING DIODE LAMP AND CIRCUIT THEREOF

(71) Applicant: Aircraft Lighting International Inc., Hauppauge, NY (US)

(72) Inventor: Ziang Lin, Albertson, NY (US)

(73) Assignee: AIRCRAFT LIGHTING INTERNATIONAL INC., Hauppauge, NY (US)

( * ) Notice: Subject to any disclaimer, the term of this patent is extended or adjusted under 35 U.S.C. 154(b) by 0 days.

(21) Appl. No.: 17/502,945

(22) Filed: Oct. 15, 2021

(51) Int. Cl.
  *H05B 45/37* (2020.01)
  *H05B 45/345* (2020.01)
  *H02M 7/06* (2006.01)

(52) U.S. Cl.
  CPC ........... *H05B 45/37* (2020.01); *H05B 45/345* (2020.01); *H02M 7/06* (2013.01)

(58) Field of Classification Search
  None
  See application file for complete search history.

(56) References Cited

U.S. PATENT DOCUMENTS

| | | | |
|---|---|---|---|
| 5,361,017 A | 11/1994 | Krause | |
| 5,661,374 A | 8/1997 | Cassidy et al. | |
| 6,364,498 B1 | 4/2002 | Burbank | |
| 6,600,274 B1 | 7/2003 | Hughes | |
| 7,168,828 B2 | 1/2007 | Schmidt et al. | |
| 7,566,154 B2 | 7/2009 | Gloisten et al. | |
| 7,671,541 B2 | 3/2010 | Hickey | |
| 7,888,881 B2 | 2/2011 | Shteynberg et al. | |
| 7,905,638 B2 | 3/2011 | Kohlmeier-Beckmann et al. | |
| 8,025,423 B2 | 9/2011 | Hancock et al. | |
| 8,378,595 B2 | 2/2013 | Eckel et al. | |
| 8,390,216 B2 | 3/2013 | Hickey | |
| 8,476,844 B2 | 7/2013 | Hancock et al. | |
| 8,485,703 B2 | 7/2013 | Eckel et al. | |
| 8,692,487 B2 | 4/2014 | Eckel et al. | |
| 8,917,487 B2 | 12/2014 | Fish et al. | |
| 8,933,746 B1 | 1/2015 | Potter et al. | |
| 9,018,853 B2 | 4/2015 | Johannessen et al. | |
| 9,018,858 B2 | 4/2015 | Gambeski et al. | |
| 9,045,079 B2 | 6/2015 | Boomgarden et al. | |
| 9,088,172 B2 | 7/2015 | Sauerlaender | |
| 9,091,422 B2 | 7/2015 | Greenfield et al. | |
| 9,091,424 B1 | 7/2015 | Mart et al. | |
| 9,192,008 B2 | 11/2015 | Eckel et al. | |
| 9,414,459 B2 | 8/2016 | Johannessen et al. | |
| 9,419,534 B2 | 8/2016 | Johannessen et al. | |
| 9,420,644 B1 | 8/2016 | Shum | |
| 9,474,112 B2 | 10/2016 | Trinschek et al. | |
| 9,497,820 B2 | 11/2016 | Gambeski et al. | |
| 9,534,772 B2 | 1/2017 | Lowenthal et al. | |
| 9,777,914 B2 | 10/2017 | Lowenthal et al. | |
| 9,800,049 B1 | 10/2017 | Sam et al. | |
| 9,868,390 B1 | 1/2018 | Sam et al. | |
| 9,973,097 B2 | 5/2018 | Wambsganss | |
| 9,999,109 B2 | 6/2018 | Sam et al. | |
| 10,099,787 B2 | 10/2018 | Upton et al. | |

(Continued)

*Primary Examiner* — Anh Q Tran
(74) *Attorney, Agent, or Firm* — Weber Rosselli & Cannon LLP

(57) ABSTRACT

The present disclosure provides a light-emitting diode lamp designed to replace an incandescent filament bulb for illumination purposes in a transportation vehicle and a light-emitting diode circuit associated therewith.

19 Claims, 7 Drawing Sheets

(56) References Cited

U.S. PATENT DOCUMENTS

| | | |
|---|---|---|
| 10,104,730 B2 | 10/2018 | Sam et al. |
| 10,118,545 B2 | 11/2018 | Garing et al. |
| 10,118,701 B2 | 11/2018 | Johannessen et al. |
| 10,128,654 B2 | 11/2018 | Johannessen et al. |
| 10,159,128 B1 | 12/2018 | Fifield et al. |
| 10,161,615 B2 | 12/2018 | Lowenthal et al. |
| 10,186,857 B2 | 1/2019 | Potter et al. |
| 10,206,262 B2 | 2/2019 | Johannessen et al. |
| 10,219,059 B2 | 2/2019 | Dunn et al. |
| 10,433,393 B2 | 10/2019 | Johannessen et al. |
| 10,476,370 B2 | 11/2019 | Wambsganss et al. |
| 10,506,339 B2 | 12/2019 | Dunn et al. |
| 10,715,911 B2 | 7/2020 | Dunn et al. |
| 10,732,030 B2 | 8/2020 | Lendaro |
| 10,807,524 B2 | 10/2020 | O'Kell et al. |
| 10,906,646 B2 | 2/2021 | Hakla et al. |
| 10,917,951 B1 | 2/2021 | Lee et al. |
| 10,981,498 B2 | 4/2021 | O'Kell et al. |
| 10,989,382 B2 | 4/2021 | Jha et al. |
| 2007/0273299 A1* | 11/2007 | Miskin .................. H05B 45/39 315/250 |
| 2010/0096992 A1* | 4/2010 | Yamamoto ............ F21V 29/773 315/112 |
| 2011/0089866 A1 | 4/2011 | Trotter et al. |
| 2011/0090681 A1 | 4/2011 | Hobson et al. |
| 2015/0102739 A1 | 4/2015 | Millar et al. |
| 2018/0263087 A1* | 9/2018 | Miskin ................ H05B 45/382 |
| 2020/0258680 A1 | 8/2020 | Wambsganss |
| 2020/0271296 A1 | 8/2020 | O'Kell et al. |
| 2020/0275540 A1 | 8/2020 | O'Kell et al. |
| 2020/0363031 A1 | 11/2020 | Jha et al. |
| 2021/0122290 A1 | 4/2021 | Jha et al. |

\* cited by examiner

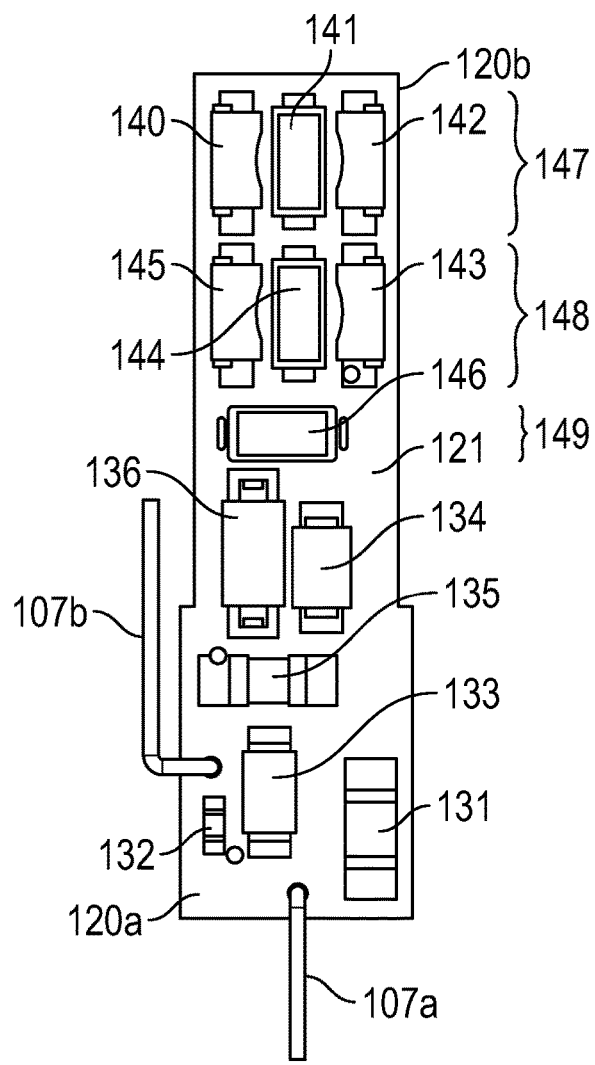
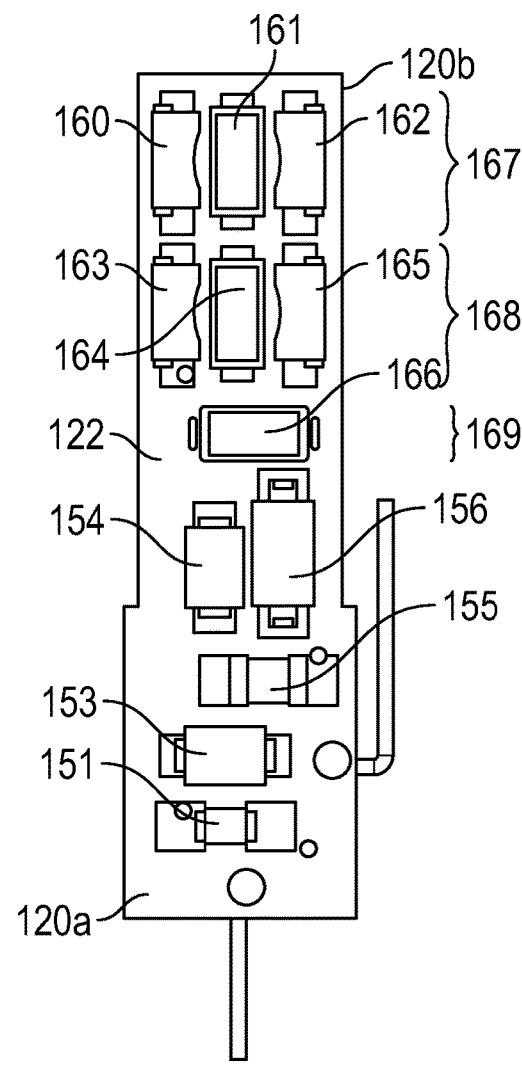
FIG. 3C
FIG. 3D

RETROFIT LIGHT-EMITTING DIODE LAMP AND CIRCUIT THEREOF

BACKGROUND

Technical Field

The present disclosure is generally related to a light-emitting diode lamp designed to replace an incandescent filament bulb for illumination purposes in a transportation vehicle and more particularly to a light-emitting diode lamp configured to be retrofitted into an existing socket for an incandescent filament in a transportation vehicle.

Description of Related Art

Transportation vehicles, such as aircrafts, trains, buses, and the like, may include a plurality of incandescent filament bulbs (IFBs) utilized for various reasons. For example, an aircraft, and particularly a conventional overhead passenger service unit (PSU) of an aircraft, may include a plurality of incandescent filament bulbs (IFBs) utilized as reading lights, call buttons, emergency lighting, seat-belt indicators, etc. IFBs are not only expensive to manufacture and replace, but the operating life of IFBs is noticeably shorter, as compared to other forms of lighting, such as ordinary light-emitting diodes (LEDs). IFBs also typically require relatively larger amounts of power to operate and emit relatively large amounts of heat, as compared to other forms of lighting. For at least these reasons, the continued use of IFBs in transportation vehicles, and particularly aircraft, may be more expensive both directly, i.e., in the purchase and maintenance of the plurality of IFBs, and indirectly, i.e., through the use of additional power and/or fuel needed to operate the IFBs, as well as cool the cabin of the vehicle from the additional heat produced therein by the IFBs. Thus, it would be beneficial both economically and environmentally to replace the IFBs with another form of lighting which is cheaper, lasts longer, emits less heat, and requires less fuel to operate.

However, simply replacing IFBs with ordinary LEDs on such vehicles, and particularly aircraft, can be difficult and costly. For example, transportation vehicles, and particularly aircraft, typically include a monitoring system designed to routinely test to determine whether an IFB is operational or not operational, e.g., not lighting due to broken filament or the socket is empty and does not include a IFB, etc. These monitoring systems may see an operational IFB as a relatively low resistance load because current easily flows therethrough, while the same monitoring system may see an non-operational IFB as a relatively high resistance load because current does not flow easily therethrough, e.g., because the filament is broken in the IFB or the socket is empty, etc. It is this difference in resistance levels and/or current flow that most monitoring systems detect in order to assess whether aircraft IFBs are operational. However, conventional LEDs utilize much less power and/or current relative to IFBs, and as such exhibit a higher resistance than IFBs. Thus, if an IFB were simply replaced with an ordinary conventional LED, the relatively higher resistance exhibited by the conventional LED would register as a fault with the monitoring system, potentially preventing the conventional LED to light and/or more likely indicating the conventional LED as non-operational and in need of repair or replacement, when in fact the conventional LED may be emitting light.

Thus, it would be beneficial to provide a new and/or non-conventional LED lamp configured to simply retrofit into an existing socket of an IFB in a transportation vehicle, such as an aircraft, and more particularly a conventional overhead PSU of an aircraft. It would further be beneficial to provide a new retrofit LED lamp designed to work with the monitoring systems of the vehicle, without producing a false fault.

SUMMARY

The present application describes LED lighting circuits and LED lamps designed to replace IFBs and/or be retrofitted into transportation vehicles including monitoring systems designed to monitor IFBs.

The present disclosure describes an LED lighting circuit including at least a first and second lead configured to conduct AC power therethrough. The LED circuit may further include a single a resistor, a first and second capacitor, and a first and second circuit branch configured to connect the first and second leads.

In some embodiments, the first circuit branch is configured to connect the resistor to the first capacitor and the second circuit branch is configured to connect the resistor to the second capacitor.

The first circuit branch includes a first and second path. The first path is configured to transmit current between the resistor and the first capacitor in a first direction and the second path is configured to transmit current between the resistor and the first capacitor in a second direction opposite the first direction. The second path includes at least a first string of LEDs.

The second circuit includes a third and fourth path. The third path is configured to transmit current between the resistor and the second capacitor in a third direction and the fourth path is configured to transmit current between the resistor and the second capacitor in a fourth direction. The fourth path includes at least a second string of LEDs.

In some embodiments, at least one, if not both, of the first and second capacitors are configured to release a burst of current while the first and second capacitors, respectively, are being charged.

In some embodiments, at least one, if not both, of the first and second capacitors are configured to be charged with an initial burst of current, while the first and second capacitors, respectively, are being charged.

In some embodiments, the first and second capacitors are located on the same side of the circuit, and particularly nearest to the second lead.

In some embodiments, the first and second paths alternate in transmitting current between the first lead and the first capacitor, while the third and fourth paths alternate in transmitting current between the first lead and the second capacitor.

In some embodiments, the first and second circuit branches are configured to alternate in transmitting current through the first or second string of LEDs.

The present disclosure further describes an LED lamp configured to replace an IFB in a transportation vehicle, and particularly without remodeling or redesigning the lighting system. The LED lamp includes at least a metal base and a transparent cap configured to form a closed bulb when combined, with a cavity formed therein configured to receive a PCB, and particularly a double-sided PCB.

A first end portion of a first face of the PCB may include at least a first and second rectifier diode spaced along a length of the first face with a first capacitor positioned therebetween, and a first constant current regulator positioned on an opposite side of the second rectifier diode. In some embodiments, the first end portion of the first face may further include a fuse and/or a bypass capacitor. In some embodiments, the first diode may be positioned between the fuse and the bypass capacitor.

A first end portion of the second face of the PCB may include at least a single resistor, a third and fourth rectifier diode spaced along a length of the second face with a second capacitor positioned therebetween and a second constant current regulator positioned on an opposite side of the fourth rectifier diode.

A second end portion of each of the first and second faces of the PCB may include a plurality of LEDS. In some embodiments, the second end portion of the first face of the PCB includes a first outer row of LEDs, a first middle row of LEDs, and a first inner row including only a single LED. The first outer row of LEDs may include a first forward-emitting middle LED sandwiched between a first pair of side-emitting LEDs. The first middle row of LEDs may include a second forward-emitting middle LED sandwiched between a second pair of side-emitting LEDs. The first middle row of LEDs is located below the first outer row of LEDs.

In some embodiments, the first forward-emitting middle LED and the first pair of side-emitting LEDs may extend longitudinally along the length of the first face, the second forward-emitting middle LED and the second pair of side-emitting LEDs may extend longitudinally along the length of the first face, and the single LED may define a length extending transverse to the length of the first face. The single LED of the first inner row may be forward-emitting.

In some embodiments, the second end portion of the second face of the PCB includes a second outer row of LEDs, a second middle row of LEDs, and second inner row including only a single LED. The second outer row of LEDs may include a third forward-emitting middle LED sandwiched between a third pair of side-emitting LEDs. The second middle row of LEDs may include a fourth forward-emitting middle LED sandwiched between a fourth pair of side-emitting LEDs. The second middle row of LEDs is located below the second outer row of LEDs. The single LED of the second inner row may be a forward-emitting LED.

In some embodiments, the third forward-emitting middle LED and the third pair of side-emitting LEDs extend longitudinally along the length of the second face, the fourth forward-emitting middle LED and the fourth pair of side-emitting LEDs extend longitudinally along the length of the second face, and the single LED of the third row extends generally transverse to the length of the second face.

BRIEF DESCRIPTION OF THE DRAWINGS

Various aspects and features of the present disclosure are described herein below with reference to the drawings, wherein:

FIGS. 3A-3D depict schematic side views of an LED lamp as described in at least one embodiment herein;

DETAILED DESCRIPTION

The present disclosure describes an LED lamp, i.e., a non-filament lamp, configured to retrofit into an existing socket designed for an IFB, i.e., a filament lamp. The present disclosure also describes a LED lighting circuit suitable for use in such an LED lamp.

The LED lamps and/or the LED lighting circuits described herein may be used to replace IFBs presently used in any transportation vehicle, such as an automobile, bus, train, or aircraft. In some embodiments, the LED lamps and/or the LED lighting circuits described herein may be used to replace IFBs located in either an overhead console of an automobile or a PSU of a bus, train, or aircraft, such as a private or commercial airplane.

Figure 1:
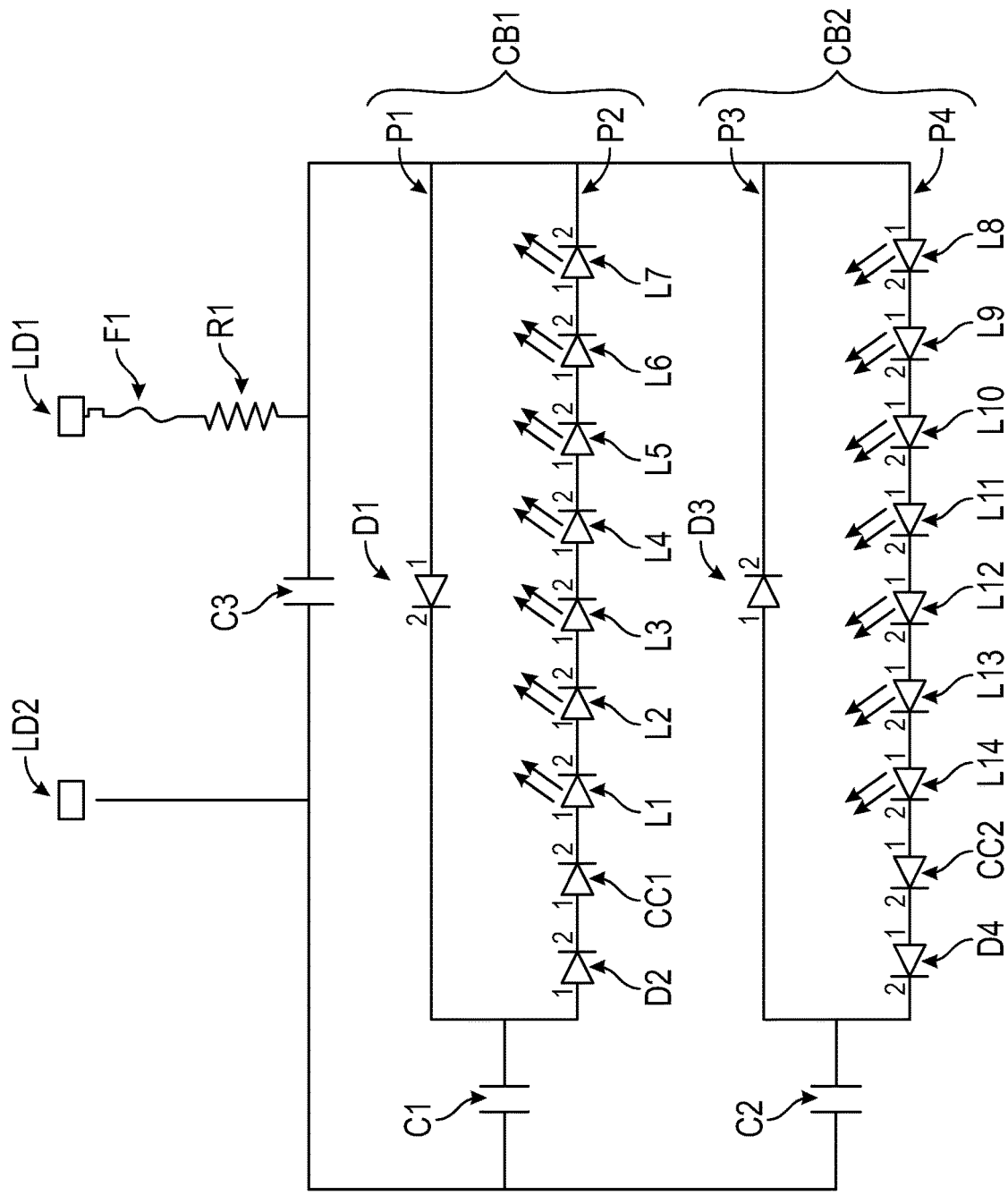
FIG. 1 depicts a schematic design of an LED circuit as described in at least one embodiment herein.

FIG. 1 depicts an LED lighting circuit configured to be used with an LED lamp described herein. The circuit may be designed to convert AC power to DC power for lighting LED lights. The LED lighting circuit enables the production of an LED lamp configured to replace an IFB in a transportation vehicle. In some embodiments, the LED lighting circuits and/or the LED lamps described herein may be used to retrofit into a PSU of a transportation vehicle, such as an aircraft.

As shown in FIG. 1, an LED lighting circuit LLC as described herein may include a first lead LD1 connected to a second lead LD2 by a first circuit branch CB1 and a second circuit branch CB2. The LED circuit LLC may include at least one of a fuse F1, a resistor R1, and/or a bypass capacitor C3. In some embodiments, the LED circuits LLC may include only one of each of a fuse F1, a resistor R1, and a bypass capacitor C3. In some embodiments, the LED lighting circuits LLC include only one resistor R1.

In some embodiments, a fuse F1 is located between the first lead LD1 and a resistor R1. In some embodiments, a fuse F1 and a resistor R1 are located between the first lead LD1 and the first circuit branch CB1. In some embodiments, a fuse F1 and a resistor R1 are located between the first lead LD1 and the second circuit branch CB2.

The first circuit branch CB1 includes a first and second path P1, P2 configured to transmit current and/or power between the first lead LD1 (and/or the resistor R1) and a first capacitor C1 (and/or the second lead LD2) in opposing directions. For example, the first path P1 is configured to transmit current and/or power from the first lead LD1 (and/or the resistor R1) to the first capacitor C1, and the second path P2 is configured to transmit current and/or power in an opposite direction of the first path P1 from the first capacitor C1 to the first lead LD1 (and/or resistor R1). The first path P1 may include a first diode D1, e.g., a rectifier diode, configured to ensure the flow of current and/or power in one direction and the second path P2 may include a similar (but reversed) second diode D2, e.g., a rectifier diode, the first and second diodes D1, D2 arranged to transmit current and/or power in opposite directions between the first lead LD1 (and/or the resistor R1) and the capacitor C1 (and/or the second lead LD2). The first and second paths P1, P2 alternate in sharing a common first capacitor C1.

In some embodiments, the first path P1 includes only the first diode D1. In some embodiments, the second path P2 further includes a first constant current regulator CR1 and a first string of LEDs L1-L7 in series. The first constant current regulator CR1 may regulate the current going through the LEDs L1-L7 by dropping any extra voltage thereon. In some embodiments, the first constant current regulator CR1 and the second diode D2 may be located on the same side of the string of LEDs L1-L7. In some embodiments, the first constant current regulator CR1 and the second diode D2 may be located on an opposite sides of the string of LEDs L1-L7.

Any number of LEDs may be combined to form the first string. In some embodiments, the first string of LEDs may include an odd number of LEDs. In some embodiments, the first string of LEDs may include from 5-10 LEDs. In some embodiments, the first string may include six or seven LEDs.

The first and second paths P1, P2 are also designed to alternate in transmitting current and/or power between the first lead LD1 and the first capacitor C1. For example, when the current and/or power is being transmitted from LD1 (and/or resistor R1) to the first capacitor C1 along the first path P1, the first path P1 (and/or the first diode D1) is active while the second path P2 (and/or the second diode D2, the first constant current regulator CR1, and the first string of LEDs L1-L7) is inactive. In an alternative example, when the alternating current and/or power is being transmitted from the first capacitor C1 (and/or the second lead LD2) to the first lead LD1 (and/or resistor R1) along the second path P2, the first path P1 (and/or the first diode D1) is inactive while the second path P2 (and/or the second diode D2, the first constant current regulator CR1, and the first string of LEDs L1-L7) is active allowing the first string of LEDs L1-L7 to emit light.

The second circuit branch CB2 includes a third and fourth path P3, P4 configured to transmit current and/or power between the first lead LD1 (and/or the resistor R1) and a second capacitor C2 (and/or second lead L2) in opposing directions. For example, the third path P3 is configured to transmit current and/or power from the first lead LD1 (and/or the resistor R1) to the second capacitor C2, and the fourth path P4 is configured to transmit current and/or power in an opposite direction of the third path P3 from the second capacitor C2 to the first lead LD1 (and/or resistor R1). The third path P3 may include a third diode D3, e.g., a rectifier diode, configured to ensure the flow of current and/or power in one direction and the fourth path P4 may include a similar (but reversed) fourth diode D4, e.g., a rectifier diode, the third and fourth D3, D4 arranged to transmit current and/or power in opposite directions between the first lead LD1 (and/or resistor R1) and the capacitor C2 (and/or the second lead LD2).

In some embodiments, the third path P3 includes only the third diode D3. In some embodiments, the fourth path P4 further includes a second constant current regulator CR2 and a second string of LEDs L8-L14 in series. The second constant current regulator CR2 may regulate the current going through the LEDs L8-L14 by dropping any extra voltage thereon. Any number of LEDs may be combined to form the second string. In some embodiments, the second string of LEDs may include an odd number of LEDs. In some embodiments, the second string of LEDs may include from 5-10 LEDs. In some embodiments, the second string may include six or seven LEDs.

The third and fourth paths P3, P4 are designed to alternate in transmitting current and/or power between the first lead LD1 and the second capacitor C2. For example, when the current and/or power is being transmitted from LD1 (and/or resistor R1) to the second capacitor C2 along the fourth path P4, the third path P3 (and/or the third diode D3) is inactive and the fourth path P4 (and/or the fourth diode, second constant current regulator CR2, and second string of LEDs L8-L14) is active allowing the second string of LEDs L8-L14 to emit light. In an alternative example, when the alternate current and/or power is being transmitted from the second capacitor C2 to the first lead LD1 (and/or resistor R1) along the third path P3, the third path P3 (and/or the third diode D3) is active and the fourth path P4 (and/or the fourth diode D4, the second constant current regulator CR2, and the second string of LEDs L8-L14) is inactive. The third and fourth paths P3, P4 alternate in sharing a common second capacitor C2.

In some embodiments, the first and second circuit branches CB1, CB2 (and/or the second and fourth paths P2, P4) are configured to alternate in transmitting current and/or power through the first and second string of LEDs L1-L7, L8-L14. For example, in some embodiments, the first string of LEDs L1-L7 may initially be active and/or emit light while the second string of LEDs L8-L14 may initially be inactive and/or do not emit light, followed by the first string of LEDs L1-L7 becoming inactive and/or not emitting light while the second string of LEDs L8-L14 becomes active and/or begins to emit light. Alternatively, in some embodiments, the first string of LEDs L1-L7 may initially be inactive and/or do not emit light while the second string of LEDs L8-L14 may initially be active and/or emit light, followed by the first string of LEDs L1-L7 becoming active and/or emitting light while the second string of LEDs L8-L14 becomes inactive and/or stops emitting light.

The LED circuits described herein include branches and/or paths which alternately produce light at a pace that is generally undetectable to the human eye thereby producing what appears as a steady stream of LED light to the human eye.

In some embodiments, the LED circuit may include first and/or second capacitors C1, C2 having a value of 0.5 to 20 microfarads. In some embodiments, the LED circuit may include first and/or second capacitors C1, C2 having a value of 1 to 5 microfarads. In some embodiments, the LED circuit may include first and/or second capacitors C1, C2 having a value 2.2 microfarads.

In some embodiments, the first and second capacitors C1, C2 may be located on the same side of each circuit branch CB1, CB2 and/or the same side of each path P1, P2, P3, P4.

Figure 2:
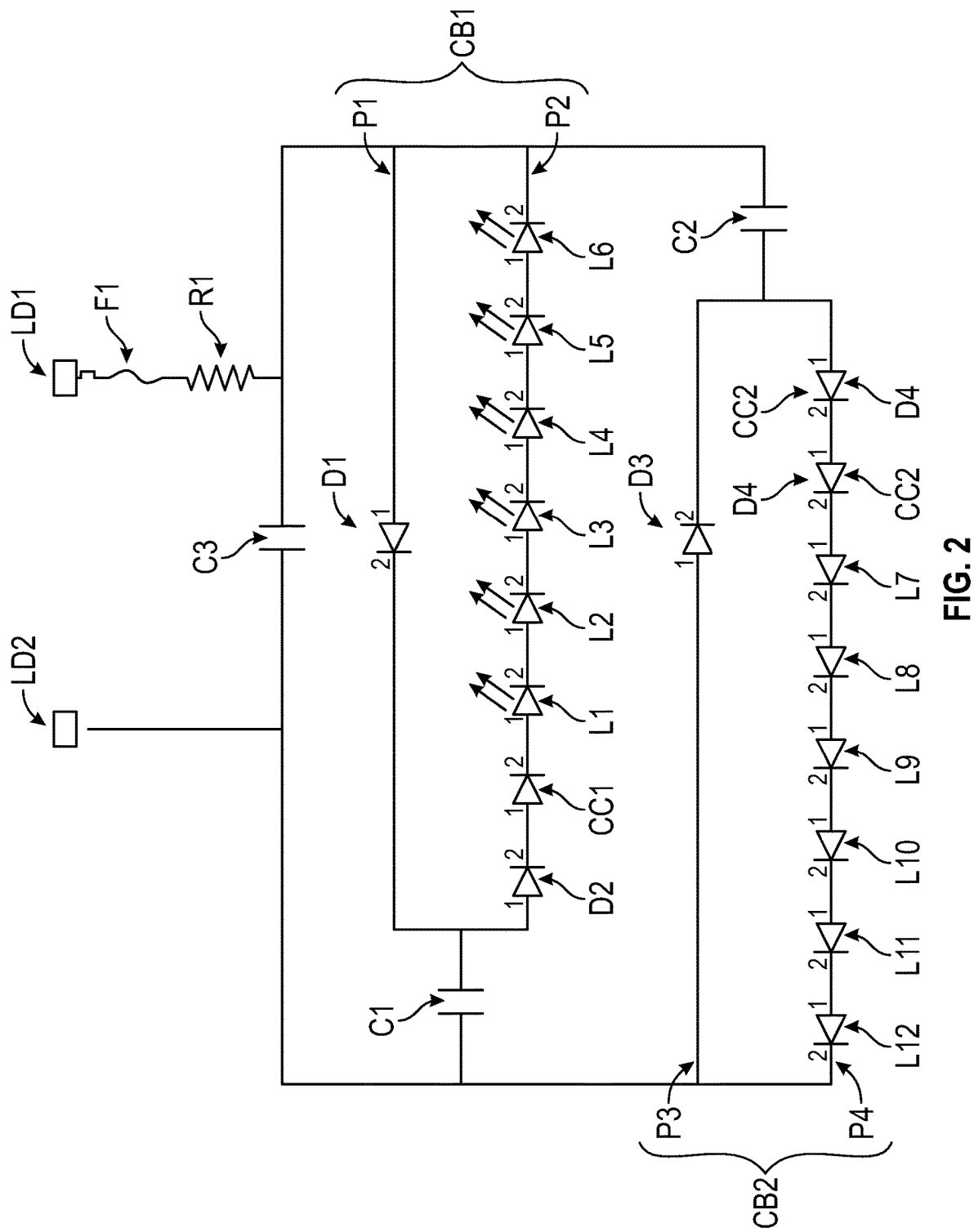
FIG. 2 depicts another LED circuit as described in at least one embodiment herein.

In some embodiments, as shown in FIG. 2, the first and second capacitors C1, C2 may be located on opposite sides of each circuit branch CB1, CB2 and/or on opposite sides of second and fourth paths P2, P4. In such embodiments, the second circuit branch CB2 is configured to transmit current and/or power from the resistor R1 to the second lead LD2 with the second capacitor C2 positioned therebetween. In such embodiments, the third and fourth paths P3, P4 are configured to transmit current and/or power between the second capacitor C2 and the second lead LD2.

In some embodiments, the first capacitor C1 may be charged with a burst of current and/or power when the first path P1 is active and the second path P2 is inactive.

In some embodiments, the first capacitor C1 may be charged with a burst of current and/or power when the first path P1 is active and the third path P3 is inactive.

In some embodiments, the first capacitor C1 may be charged with a burst of current and/or power when the first path P1 is active and the fourth path P4 is active such that the second string of LEDs L8-L14 emit light.

In some embodiments, the first capacitor C1 may be charged with a burst of current and/or power when the first path P1 is active and the second and third paths P2, P3 are inactive, and the fourth path P4 is active such that the second string of LEDs L8-L14 emit light.

In some embodiments, the first capacitor C1 may be charged with a burst of current and/or power when the first path P1 is active, the second and third paths P2, P3 are inactive, the fourth path P4 is active such that the second string of LEDs L8-L14 emit light, and the second capacitor C2 discharges and/or releases current and/or power. In such embodiments, the second capacitor C2 may be configured to empty when discharging. The releasing current from the second capacitor C2 may be constant and controlled by second current regulator CR2.

In some embodiments, the second capacitor C2 may be charged with a burst of current and/or power when the third path P3 is active and the fourth path P4 is inactive.

In some embodiments, the second capacitor C2 may be charged with a burst of current and/or power when the third path P3 is active and the first path P1 is inactive.

In some embodiments, the second capacitor C2 may be charged with a burst of current and/or power when the third path P3 is active and the second path P2 is active such that the first string of LEDs L1-L7 emit light.

In some embodiments, the second capacitor C2 may be charged with a burst of current and/or power when the third path P3 is active and the first and fourth paths P1, P4 are inactive, and the second path P2 is active such that the first string of LEDs L1-L7 emit light.

In some embodiments, the second capacitor C2 may be charged with a burst of current and/or power when the third path P3 is active, the first and fourth paths P1, P4 are inactive, the second path P2 is active such that the first string of LEDs L1-L7 emit light, and the first capacitor C1 discharges and/or releases current and/or power. In such embodiments, the first capacitor C1 may be configured to empty when discharging. The releasing current from the first capacitor C1 may be constant and controlled by first current regulator CR1.

Turning to FIGS. 3A-3D, which depicts an LED lamp configured to replace an IFB in a transportation vehicle. In some embodiments, the LED lamp may be configured to replace an IFB in an aircraft. In some embodiments, the LED lamp or lamp may be configured to replace an IFB in a PSU and/or overhead PSU.

As shown, the LED lamp 100 includes a metal base 110 with a tubular sidewall 111 extending between a first end 110a which is closed and a second opposite end 110b which is open. The metal base 110 defines a base cavity 112 therein. The base cavity 112 is configured to receive a printed circuit board (PCB) 120 therein, as well as any suitable potting material 125.

The PCB 120 extends between a first end portion 120a and a second end portion 120b and includes a first face 121 and an opposite second face 122, each face 121, 122 including a plurality of LEDs 140-146, 160-166 positioned thereon. The first end portion 120a of the PCB is configured to be positioned with the base cavity 112 of the base 110 with the second opposite end portion 120b extending from the base 110 and/or base cavity 112.

A cap 105 of suitable material, such as a molded plastic or glass, extends between an open end portion 105a and a closed end portion 105b. The open end portion 105a of the cap 105 is positioned over the second end portion 120b of the PCB 120 and matingly engages the second open end portion 110b of the base 110. In some embodiments, the open end 105a of the cap 105 fits into a portion of the cavity on top of the potting material 125.

The closed end portion 110a of the base 110 may include an electrical contact 113 extending therefrom. The contact 113 configured to conduct current therethrough to power the LED lamp and/or circuit.

The LED lamp 100 includes base 110 configured to retrofit into a socket designed to receive an incandescent lamp. In some embodiments, the base is free of threads on an outer surface thereof. In some embodiments, the base may include threads on an outer surface thereof, the threads configured to aid in the screwing in of the lamp into a socket of an IFB.

FIGS. 3C and 3D depict the first and second faces 121, 122 of the PCB 120 described herein. The first face 121 includes a pair of wires 107a, 107b extending from the first end portion 120a of the PCB 120. The first wire 107a may extend along a central longitudinal axis $A_1$ of the PCB 120 and is configured to connect to the metal base 110 to conduct current and/or power from the base 110 (and/or the socket) to the PCB 120. The second wire 107b is a ground.

The PCB 120 is configured to be placed vertically and/or longitudinally into the base cavity 112 of the base 110. The first end portion 120a of the first face 121 further includes a fuse 131, a bypass capacitor 132, a first and second rectifier diode 133, 134 spaced along a length of the PCB 120 with a first capacitor 135 positioned therebetween and a constant current regulator 136 positioned next to the second rectifier diode 134.

The second end portion 120b of the first face 121 of the PCB 120 includes a plurality of LEDs 140-146. In some embodiments, the second end portion 120b of the first face 121 of the PCB 120 includes seven LEDs 140-146. In some embodiments, the plurality of LEDs 140-146 is distributed across three rows 147-149.

In some embodiments, a first outer row 147 includes a first pair of side-emitting LEDs 140, 142 positioned on opposite sides of a first forward-emitting middle LED 141 and a first middle row 148 includes a second pair of side-emitting LEDs 143, 145 positioned on opposite sides of a second forward-emitting middle LED 144. The LEDs 140-145 of the first two rows 147, 148 on the first face 121 extend vertically along a length of the PCB 120. A first inner row 149 includes only a single LED 146 extending horizontally across a width of the PCB 120 and/or transverse to the first and/or second row 147, 148 of LEDs 140-145.

The second end portion 120b of the second face 122 of the PCB 120 also includes a plurality of LEDs 160-166. In some embodiments, the second end portion 120b of the second face 122 of the PCB 120 includes seven LEDs 160-166. In some embodiments, the plurality of LEDs 160-166 is distributed across three rows 167-169.

In some embodiments, a second outer row 167 includes a third pair of side-emitting LEDs 160, 162 positioned on opposite sides of a third forward-emitting middle LED 161 and a second middle row 168 includes a fourth pair of side-emitting LEDs 163, 165 positioned on opposite sides of a fourth forward-emitting middle LED 164. The LEDs 160-165 of the first two rows 167, 168 on the second face 122 extend vertically along a length of the PCB 120. The second inner row 169 includes only a single LED 166 extending horizontally across a width of the PCB 120 and/or transverse to the first and/or second row 167, 168 of LEDs 160-165.

The first end portion 120a of the second face 122 further includes a resistor 152, a third and fourth rectifier diode 153, 154 spaced along a length of the PCB 120 with a second capacitor 155 positioned therebetween and a second constant current regulator 156 positioned next to the fourth rectifier diode 154.

Figure 3A:
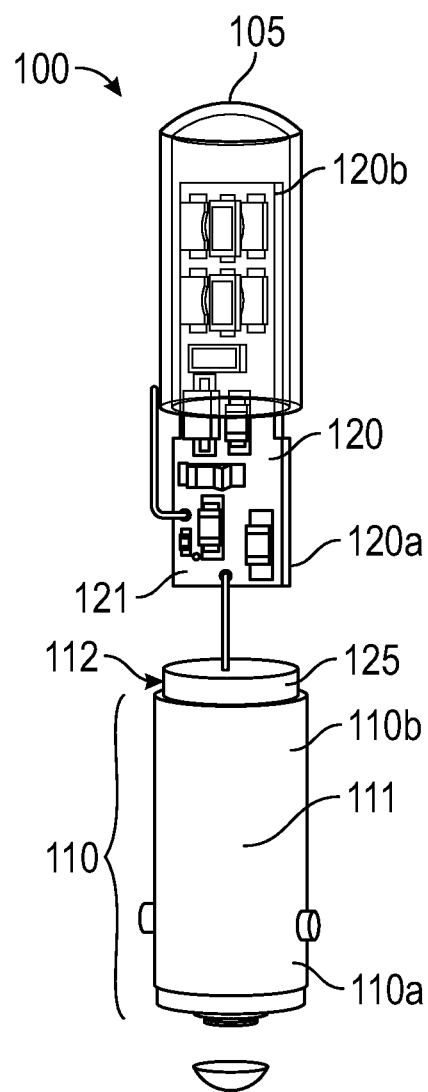
Figure 3B:
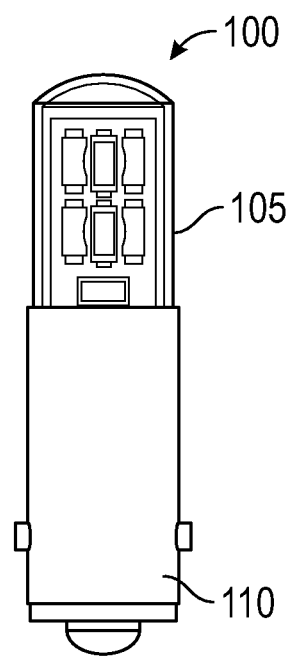

As further shown in FIGS. 3A and 3B, when the PCB 120 is combined with the metal base 110 and the cap 105, only the three rows 147-149, 167-169 of LEDs 140-146, 160-166 are located within the cap cavity 106 defined with the cap 105 thereby being configured to distribute a maximum level of light through the cap 105 from inside the cavity 106, while the various electronic components described hereinabove are located inside the base cavity 112 hidden from sight by either the base 110 and/or the potting material 125. In this configuration, one single LED lamp 100 may emit light in 360 degrees around the PCB 120.

The LED circuits and/or LED lamps described herein are configured for deployment within a vehicle's existing IFB sockets, and particularly the IFB sockets of an aircraft and/or an overhead PSU, thereby eliminating the need to retroactively alter the vehicle and/or existing socket already fitted for receiving IFBs. The cost of replacing a vehicle's IFB with the LED circuits and/or LED lamps described herein is greatly reduced.

Existing IFB sockets of an overhead PSU include reflectors designed to reflect the light from a IFB to maximize light emission. The LED lamps described herein are configured to mimic the light output of a typical IFB using LEDs and particularly the combination of side-emitting LEDs with a middle forward-emitting LEDs to emit light uniform light in 360 degrees. As depicted the side-emitting LEDs are located along the outermost edge of the PCB to reduce the size of the light source and maximize exposure of the emitted light. In some embodiments, the LED lamps described herein are configured to reflect the LED light off the PSU socket reflectors in all directions.

The LED lamps and/or circuits described herein may also produce low amounts of heat, as compared to IFBs and/or ordinary LEDs. In some embodiments, the LED lamp may not include a heat sink and/or any other device configured to aid in dissipating potential excess heat commonly associated with ordinary LEDs.

The LED circuits and/or LED lamps described herein are also configured to work in connection with a vehicle's existing monitoring system, thereby allowing replacement of an IFB with the LED circuits and/or LED lamps described herein without further having to modify the existing monitoring system.

Figure 4:
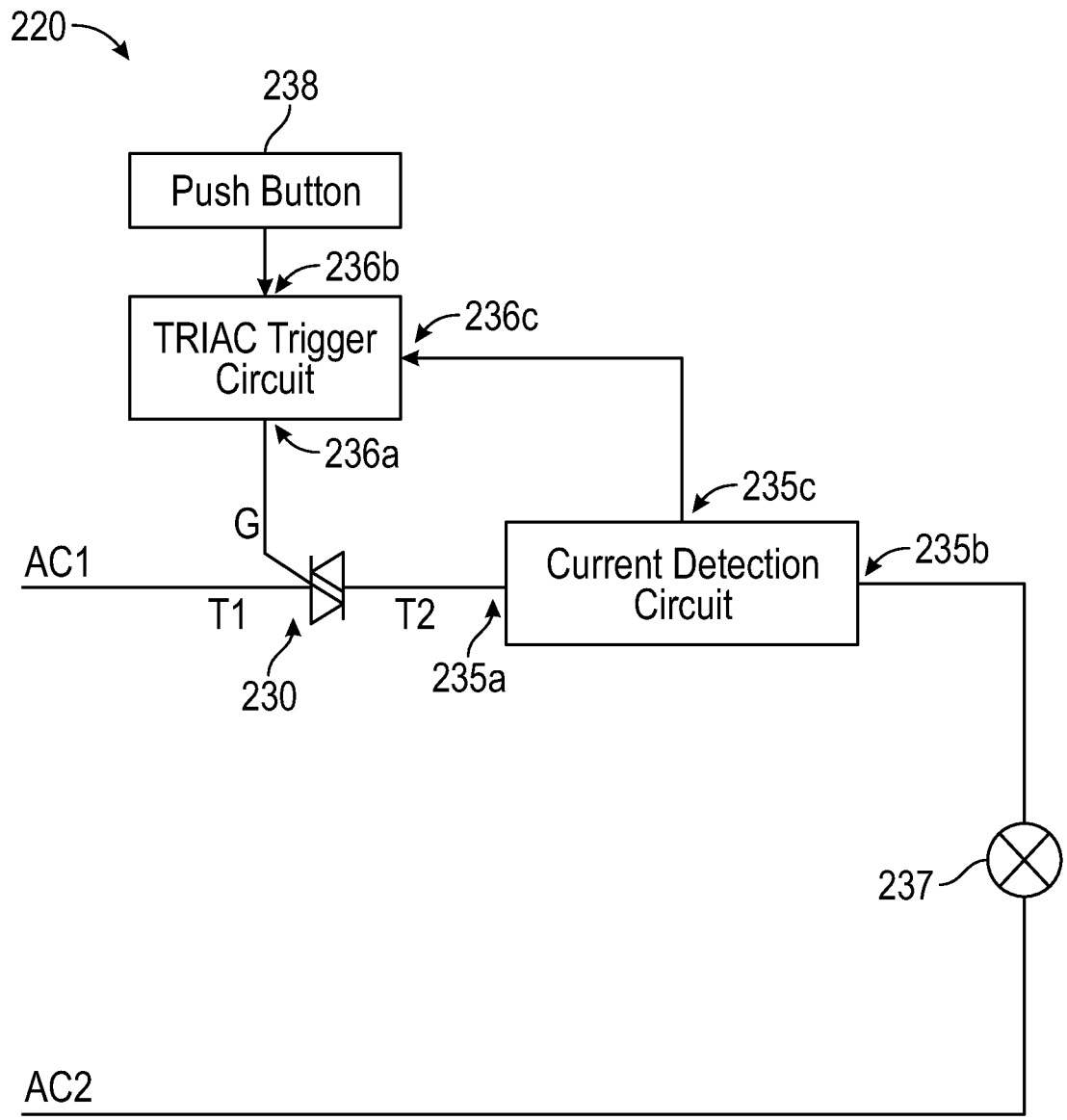
FIG. 4 depicts a schematic design of a monitoring system as described in at least one embodiment herein.

FIG. 4 depicts an example of a monitoring system 220 suitable for use with the LED circuits and/or LED lamps described herein. The system 220 including a TRIAC 230 having a first terminal T1 connected to a first lead AC1 of an AC power supply, a second terminal T2 connected to a first terminal 35a of a current detection circuit 235, and a gate G connected to a first terminal 236a of a TRIAC triggering circuit 236. The current detection circuit 235 and the TRIAC triggering circuit 236 each further include a second and third terminals 235b, 235c, 236b, 236c, respectively.

The second terminal 235b of the detection circuit 235 is connected to a second lead AC2 of an AC power supply with a light source 237, such as an LED lamp as described herein, positioned therebetween. The second terminal 236b of the TRIAC triggering circuit 236 is connected to a push button 238 configured to turn on and off the system 220, as well as the LED circuits described herein, and/or the LED lamps described herein. The third terminal 236c of the TRIAC triggering circuit 236 is connected to a third terminal 235c of the detection circuit 235.

When the push button 238 is activated, the TRIAC trigger circuit 236 sends a trigger signal 241 with a drop 241a to the gate G to turn on the TRIAC 230 and the TRIAC 230 remains on as long as the current 244 continues to flow through the TRIAC 230 in either direction. However, as illustrated schematically in FIG. 5, whenever the waveform of AC power 242 reaches zero (see arrows), the TRIAC 230 is triggered by a drop 241a of the trigger signal 241 and the current detection circuit 235 is initiated to detect if the light source 237 is providing the proper level of resistance and/or allowing the proper amount of current to pass therethrough. If the correct resistance and/or current is detected, the detection circuit 235 determines the light source 237 is operating properly and signals the trigger circuit 236 to again send the trigger signal 241 with a drop 241a to the gate G. If the resistance and/or current measured is not appropriate or is too high or too low relative to an IFB, the detection circuit 235 determines the light source 237 is not operating properly as an IFB and the TRIAC trigger circuit 236 stops providing the drop 241a to the gate G, thereby indicating the light source 237 may be in need of replacement.

Figure 5:
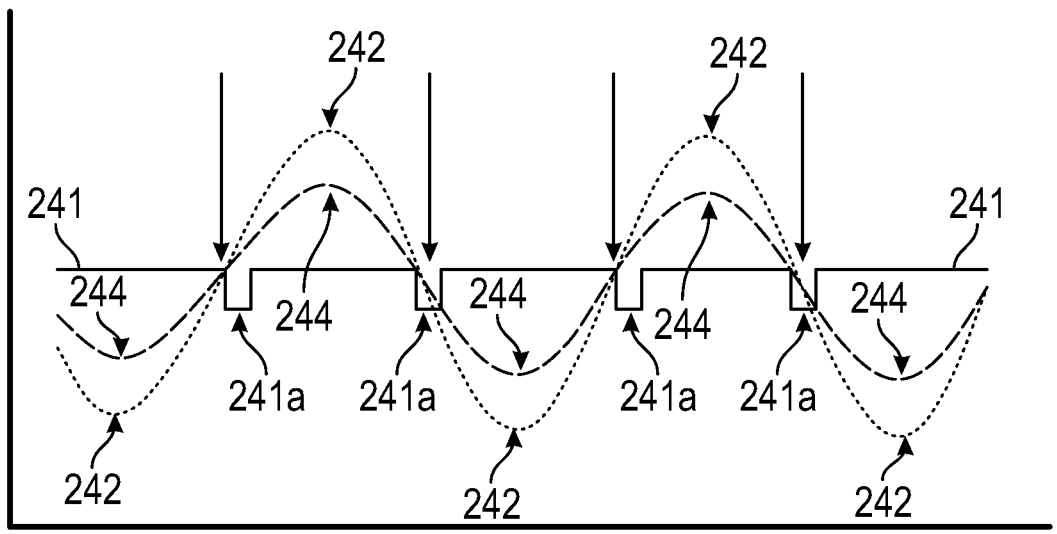
FIG. 5 depicts waveforms of AC power, a trigger signal of a monitoring system, and an IFB as described in at least one embodiment herein.

FIG. 5 further schematically compares the generally sinusoidal waveform of AC power 242 with the generally sinusoidal waveform of current 244 of a ty pical IFB. As shown, the current 244 of the IFB zeroes (at the same time as the AC power 242) and quickly increases during the drop 241a of the trigger signal 241. It is this increase, immediately after zeroing (and/or the drop 241a of the trigger signal 241), that the monitoring system 220 measures during the drop 241a of the signal 241.

In some embodiments, the increase in current in the IFB during the drop of the trigger signal (and/or after zeroing) may represent from 50 to 300 mAmps. In some embodiments, the increase in current in the IFB may represent from 100 to 275 mAmps. In some embodiments, the increase in current in the IFB may represent from 150 to 250 mAmps.

Figure 6:
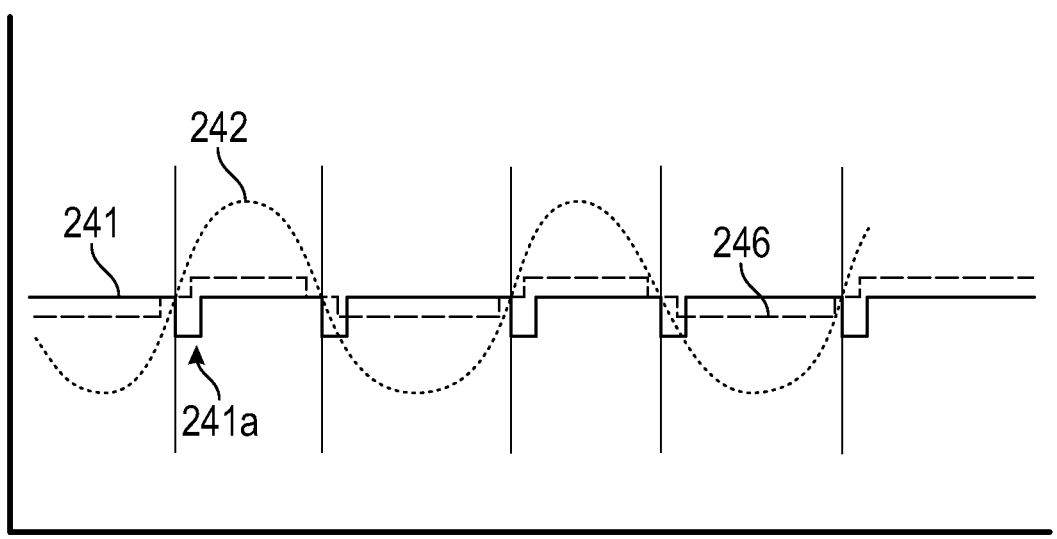
FIG. 6 depicts waveforms of AC power, a trigger signal of a monitoring system, and an ordinary LED as described in at least one embodiment herein.

FIG. 6 compares the generally sinusoidal waveform of AC power 242 with the generally linear and/or significantly less sinusoidal waveform of current 246 of an ordinary LED. As shown, an ordinary LED may require significantly less current to operate, such as 10-50 mAmps of the ordinary LED as compared to 200-500 mAmps of an IFB. This generally linear low level of current 246 may be sufficient to continuously activate an ordinary LED (not an IFB), however the generally low level of current 246 is either not high enough to be detected by the detection circuit 235 or the detection circuit 235 detects the low level current 246 as insufficient to be an inoperable IFB. As a result, an ordinary LED is not compatible with such a monitoring system 220 because a fault is created when the current of the ordinary LED is either not detected or improperly detected across the gap 241a. A fault indicates the light source, in this case an ordinary LED, is not operational and in need of replacement, even though the ordinary LED may or may not be operational. Thus, ordinary LEDs render monitoring systems configured to be used with IFBs, as many of the existing monitoring systems are, inefficient, ineffective, and/or unusable.

Figure 7:
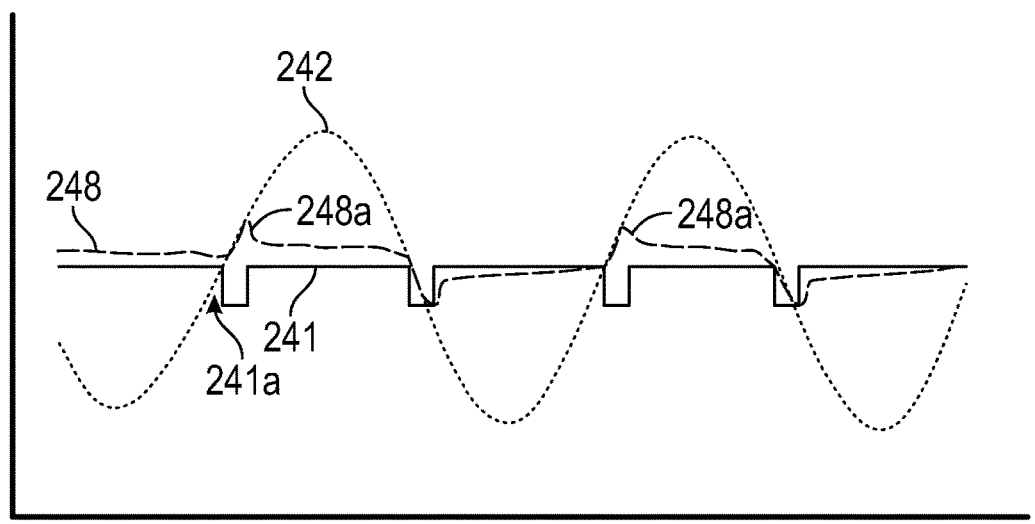
FIG. 7 depicts waveforms of AC power, a trigger signal of a monitoring system, and an LED lamp and/or lighting circuit as described herein, as described in at least one embodiment herein; and, FIG. 8 depicts waveforms of AC power and the voltage on the first and second capacitors of the LED lamp and/or lighting circuit as described herein.

FIG. 7 compares the generally sinusoidal waveform of AC power 242 with the waveform of current 248 of an LED lamp and/or LED circuit as described herein. As shown, an LED lamp and/or LED circuit as described herein may require significantly less current to operate, such as 10-50 mAmps as compared to 200-500 mAmps of an IFB. However, unlike an ordinary LED, the LED lamps and/or circuits described herein are designed to display a burst of current 248*a* each time the current 248 of the LED lamp zeros, thereby providing a brief but rapid increase at the same time that the trigger signal 241 drops 241*a* and the detection circuit 235 attempts to detect a current waveform similar to an IFB As a result of the timely rapid increase or burst of current 248*a*, the LED circuits and/or lamps described herein, unlike ordinary LEDs, are compatible with such a monitoring system 220 because at the time the monitoring system is attempting to detect a current associated with an IFB, the LED circuit and/or lamps described herein display a burst of current to trick the monitoring system (and/or the detection circuit) in believing an operational IFB is being used and/or in the socket.

The burst of current 248*a* of the LED lamps and/or lighting circuits during the drop 241*a* of the trigger signal 241 (and/or after zeroing) may range from 50 to 300 mAmps. In some embodiments, the burst of current may represent from 100 to 275 mAmps. In some embodiments, the burst of current may represent from 150 to 250 mAmps.

The burst of current can be charged to at least one, if not both, of the first and second capacitors of the LED circuits and/or lamps described herein. The capacitors are designed to alternate between the charging and discharging of current as the AC power alternates the current passing through the lamp and/or circuit. In some embodiments, the first capacitor may charge current (charging the burst of current) while the second capacitor discharges a current, such as at a constant current in some embodiments, the first capacitor may discharge current, such as at a constant current, while the second capacitor charges current (charging the burst of current).

Figure 8:
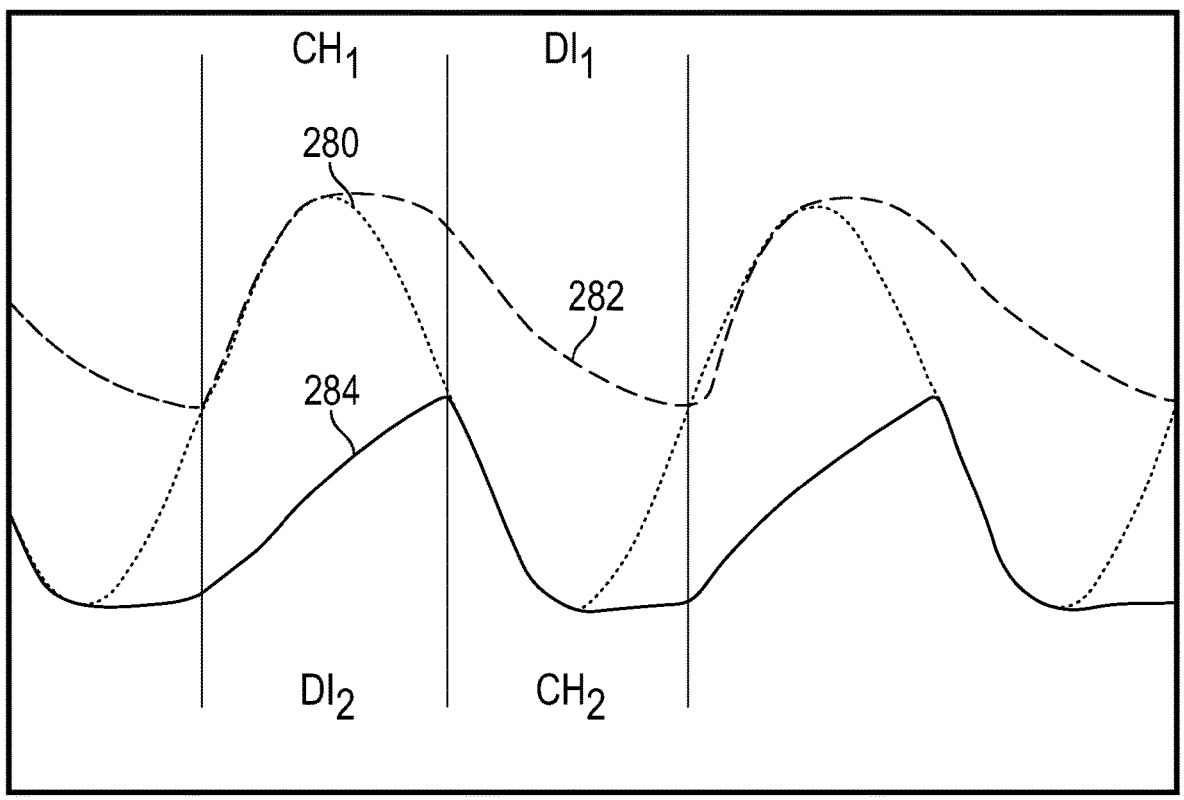

FIG. 8 compares the generally sinusoidal waveform of AC power 280 with the voltage 282, 284 on the first and second capacitors as described herein. As illustrated in FIG. 8, when the first capacitor is charging CH1 the second capacitor is discharging DI2 and when the first capacitor is discharging DI1 the second capacitor is charging CH2, with the voltage peaking on each of the first and second capacitors when each are charging CH1, CH2, respectively.

While several embodiments of the disclosure have been shown in the drawings, it is not intended that the disclosure be limited thereto, as it is intended that the disclosure be as broad in scope as the art will allow and that the specification be read likewise. Therefore, the above description should not be construed as limiting but merely as exemplifications of particular embodiments. Those skilled in the art will envision other modifications within the scope and spirit of the claims appended hereto.

What is claimed is:

1. An LED lighting circuit comprising:
   a first and second lead configured for AC power,
   a resistor,
   a first capacitor,
   a second capacitor,
   a first circuit branch connecting the resistor to the first capacitor, the first circuit branch including a first and second path configured to transmit current between the resistor and the first capacitor in opposite directions, the second path including a first string of LEDs, and
   a second circuit branch connecting the resistor to the second capacitor, the second circuit branch including a third and fourth path configured to transmit current between the resistor and the second capacitor in opposite directions, the fourth path including a second string of LEDs, wherein the first and second circuit branches are configured to alternate in transmitting current through the first or second string of LEDs.

2. The LED lighting circuit of claim 1, wherein the first path comprises a first rectifier diode.

3. The LED lighting circuit of claim 1, wherein the second path further comprises a second rectifier diode and a first constant current regulator positioned on either side of the first string of LEDs.

4. The LED lighting circuit of claim 1, wherein the third path comprises a third rectifier diode.

5. The LED lighting circuit of claim 1, wherein the fourth path further comprises a fourth rectifier diode and a second constant current regulator positioned on either side of the second string of LEDs.

6. The LED lighting circuit of claim 1, further comprising a fuse positioned between the resistor and the first lead and a bypass capacitor positioned between the resistor and the second lead.

7. The LED lighting circuit of claim 1, wherein the first and second capacitors are located on the same side of the circuit directly coupled on one end to the second lead.

8. The LED lighting circuit of claim 1, wherein first and second paths alternate in transmitting current between the first lead and the first capacitor and the third and fourth paths alternate in transmitting current between the first lead and the second capacitor.

9. The LED lighting circuit of claim 1, wherein at least one of the first and second capacitors are configured to be charged with an initial burst of current, while the first and second capacitors, respectively, are being charged.

10. An LED lamp comprising:
    a metal base defining a base cavity, the metal base configured to retrofit into a socket for an IFB in a transportation vehicle;
    a cap defining a cap cavity, the cap configured to matingly engage the metal base;
    a PCB extending between a first end portion and a second end portion and including a first face and a second opposite face, wherein
    the first end portion of the first face includes a first and second rectifier diode spaced along a length of the first face with a first capacitor positioned therebetween and a first constant current regulator positioned on the opposite side of the second rectifier diode,
    the first end portion of the second face includes a resistor, a third and fourth rectifier diode spaced along a length of the second face with a second capacitor positioned therebetween and a second constant current regulator positioned on the opposite side of the fourth rectifier diode, and
    the second end portion of the first face includes a first outer row of LEDs including a first forward-emitting middle LED sandwiched between a first pair of side-emitting LEDs, wherein the first forward-emitting middle LED and the first pair of side-emitting LEDs extend longitudinally along the length of the first face.

11. The LED lamp of claim 10, further comprising a first middle row of LEDs below the first outer row of LEDs, the first middle row of LEDs including a second forward-emitting middle LED sandwiched between a second pair of side-emitting LEDs, wherein the second forward-emitting middle LED and the second pair of side-emitting LEDs extend longitudinally along the length of the first face.

12. The LED lamp of claim 11 further comprising a first inner row below the first middle row of LEDs, the first inner row including only a single LED extending generally transverse to the length of the first face.

13. The LED lamp of claim 12 wherein the second end portion of the second face further comprises a second outer row of LEDs including a third forward-emitting middle LED sandwiched between a third pair of side-emitting LEDs, wherein the third forward-emitting middle LED and the third pair of side-emitting LEDs extend longitudinally along the length of the first face.

14. The LED lamp of claim 13 wherein the second end portion of the second face further comprises a second middle row of LEDs below the second outer row of LEDs, the second middle row of LEDs including a fourth forward-emitting middle LED sandwiched between a fourth pair of side-emitting LEDs, wherein the fourth forward-emitting middle LED and the fourth pair of side-emitting LEDs extend longitudinally along the length of the first face.

15. The LED lamp of claim 14, wherein the second end portion of the second face further comprises a second inner row below the second middle row of LEDs, the second inner row including only a single LED extending generally transverse to the length of the first face.

16. The LED lamp of claim 15, wherein only the three rows of LEDs on each of the second end portions of the first and second faces are visible within the cap.

17. The LED lamp of claim 15, wherein each of the first end portions of the first and second faces are located within a potting material positioned within the base cavity of the base.

18. The LED lamp of claim 10, wherein the base is free of a hot-sink.

19. The LED lamp of claim 16, wherein the LEDs on the first and second face of the PCB alternate emitting light at a speed undetectable by the human eye to produce a steady stream of LED light to the human eye.

* * * * *